United States Patent
Shin

(10) Patent No.: US 7,289,241 B2
(45) Date of Patent: Oct. 30, 2007

(54) PRINTING METHOD WITH SELECTABLE FAST PRINTING MODE AND APPARATUS FOR SAME

(75) Inventor: Dong-myong Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 10/900,428

(22) Filed: Jul. 28, 2004

(65) Prior Publication Data

US 2005/0024474 A1    Feb. 3, 2005

(30) Foreign Application Priority Data

Jul. 28, 2003    (KR)    .................. 10-2003-0052084

(51) Int. Cl.
  *G06K 1/00*    (2006.01)
  *B41J 2/435*    (2006.01)
(52) U.S. Cl. ........................ 358/1.2; 347/224
(58) Field of Classification Search ............... 347/224, 347/131; 346/107.5; 358/1.2; 318/696
  See application file for complete search history.

(56) References Cited

U.S. PATENT DOCUMENTS

| | | | | |
|---|---|---|---|---|
| 5,321,432 A | * | 6/1994 | Ishikawa et al. ............ | 347/131 |
| 5,321,433 A | * | 6/1994 | Zulian ......................... | 347/131 |
| 5,361,088 A | * | 11/1994 | Ito et al. .................... | 346/107.5 |
| 5,517,318 A | * | 5/1996 | Suzuki ........................ | 358/1.2 |
| 6,347,852 B1 | | 2/2002 | Chen ............................ | 347/5 |
| 6,570,672 B1 | * | 5/2003 | Hattori ........................ | 358/1.2 |
| 6,693,723 B2 | * | 2/2004 | Keithley et al. ............. | 358/1.2 |
| 2003/0141838 A1 | * | 7/2003 | Kang et al. ................. | 318/696 |

FOREIGN PATENT DOCUMENTS

| | | | |
|---|---|---|---|
| JP | 61234163 | * | 10/1986 |
| JP | 5-110824 | | 4/1993 |
| JP | 2001-270149 | | 10/2001 |
| JP | 2001-301223 | | 10/2001 |
| KR | 93-10790 | | 11/1991 |
| KR | 94-18229 | | 8/1994 |
| KR | 96-40665 | | 12/1996 |
| KR | 99-15546 | | 3/1999 |

* cited by examiner

*Primary Examiner*—Manish S. Shah
*Assistant Examiner*—Carlos A. Martinez, Jr.
(74) *Attorney, Agent, or Firm*—Staas & Halsey, LLP

(57) ABSTRACT

A printing method for a laser beam printer, including: generating a first video signal for printing a document image; converting the first video signal into a second video signal when a fast printing mode is selected; generating a driving signal for the fast printing mode and rotating a drum in response to the driving signal; and generating a laser beam in response to the second video signal and irradiating the laser beam onto the drum.

20 Claims, 6 Drawing Sheets

PRINTING METHOD WITH SELECTABLE FAST PRINTING MODE AND APPARATUS FOR SAME

CROSS-REFERENCE TO RELATED APPLICATION

This application claims the priority of Korean Patent Application No. 2003-52084, filed on Jul. 28, 2003, in the Korean Intellectual Property Office, the disclosure of which is incorporated herein by reference.

BACKGROUND OF THE INVENTION

1. Field of the Invention

The present invention relates to a fast printing method and apparatus for a laser beam printer, and more particularly, to a printing method by which documents can be printed at an increased speed when a user selects a fast printing mode.

2. Description of Related Art

The printing speed of a laser beam printer depends on the output speed of a printer engine, measured mostly in pages per minute (PPM).

FIG. 1A is a waveform diagram of video pulses provided to a conventional printer for printing documents and FIG. 1B is a diagram illustrating a dot arrangement corresponding to the waveform of the video pulses shown in FIG. 1A. The conventional printer includes a video controller and a printer engine. The video controller outputs video pulse signals for document images, and the printer engine receives the video pulse signals and prints the document images on sheets of paper.

As shown in FIGS. 1A and 1B, if a video pulse signal having a waveform shown in FIG. 1A is provided to a laser scanning unit (LSU) located in the printer engine, a laser beam is irradiated on a drum by the LSU. Then, toner particles are fused onto the drum, thus forming dots on the drum, as shown in FIG. 1B. Thereafter, the dots are finally printed on a sheet of paper.

In other words, if video signals having uniform pulses are sequentially input into the LSU for the dots of FIG. 1B to be printed out on a sheet of paper, a certain amount of toner is fused onto the drum to form each of the dots. Each of the dots to be printed out has a value of '1' or '0'. When a dot has a value of '1', one pulse is generated. On the other hand, when the dot has a value of '0', no pulse is generated.

In FIG. 1A, each horizontal line indicates a print line. A series of video pulse signals is generated for each print line, and then the series of video pulse signals is scanned in a specified area using a horizontal synchronization signal (HSYNC). The location of each print line is determined by rotating a motor connected to the drum, the frequency of which depending on the printer engine's speed.

However, in the above-described conventional printing method, documents can only be printed at a specified printing speed, irrespective of whether or not the documents contain rather complicated forms and contents to be printed. Therefore, materials, such as texts, which are considered easy to print, can never be printed out at faster speeds than the specified printing speed, even though a user wants to quickly print the documents.

BRIEF SUMMARY

Embodiments of the present invention provide a fast printing method and apparatus for a laser beam printer, by which documents can be printed at a printing speed two times faster than the printing speed in the prior art by allowing a user to select a fast printing mode.

According to an aspect of the present invention, there is provided a printing method for a laser beam printer, including: generating a first video signal for printing a document image; converting the first video signal into a second video signal when a fast printing mode is selected; generating a driving signal for the fast printing mode and rotating a drum in response to the driving signal; and generating a laser beam in response to the second video signal and irradiating the laser beam onto the drum.

The converting may include extracting every other printing line of the first video signal.

When video pulses exist both in an l-th column of an n-th printing line and in the l-th column of an (n+1)-th printing line, a pulse width of the l-th column of the n-th printing line may be increased by as much as a specified value.

The driving signal may have a frequency that makes the drum rotate two times faster in the fast printing mode than in any other mode.

According to another aspect of the present invention, there is provided a printing apparatus including: a video signal generation unit which outputs a first video signal for fast printing of a document image; an engine control unit which converts the first video signal into a second video signal when a fast printing mode is selected, generates a driving signal for the fast printing mode, and generates a laser beam in response to the second video signal; a motor driving unit which rotates a drum in response to the driving signal; and an optical unit which generates a laser beam in response to the laser beam generation signal and irradiates the laser beam onto the drum.

The engine control unit may convert the first video signal by extracting every other printing line of the first video signal.

The engine control unit may, when video pulses exist both in an l-th column of an n-th printing line and in the l-th column of an (n+1)-th printing line, increase a pulse width of the l-th column of the n-th printing line by as much as a specified value.

The engine control unit may output the driving signal having a frequency that makes the drum rotate two times faster in the fast printing mode than in any other mode.

When a printing mode other than the fast printing mode is selected, the engine control unit may not convert the first video signal and may output a driving signal and a laser beam generation signal corresponding to the first video signal.

According to another aspect of the present invention, there is provided a printing method including: converting an image signal for an image into another image signal when the image is to be printed in a first print mode; rotating a drum in response to a driving signal for the first print mode; and irradiating a laser beam onto the drum according to another image signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENT

Figure 1A:
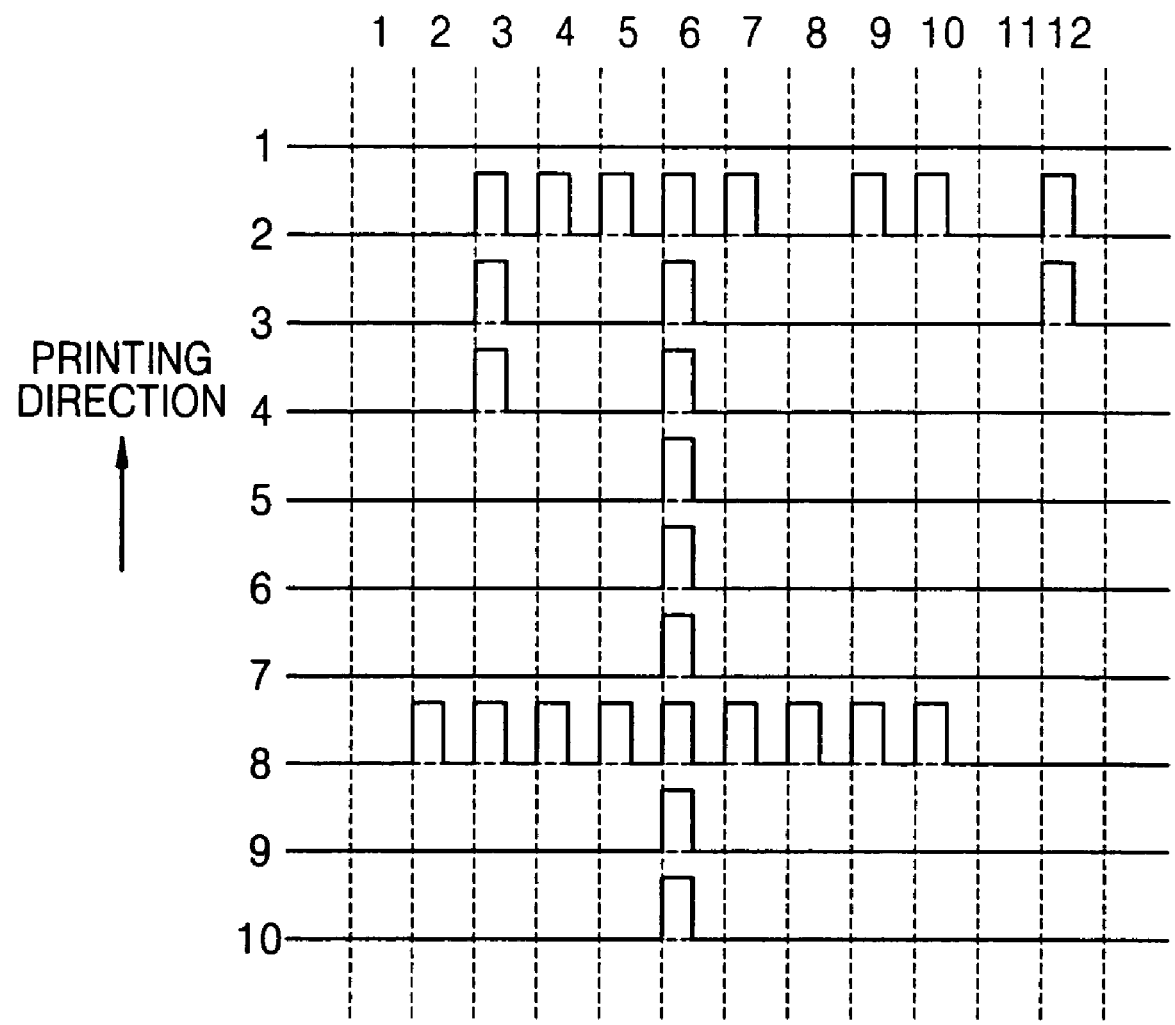
FIG. 1A is a waveform diagram of video pulses provided to a conventional printer for printing documents.
Figure 1B:
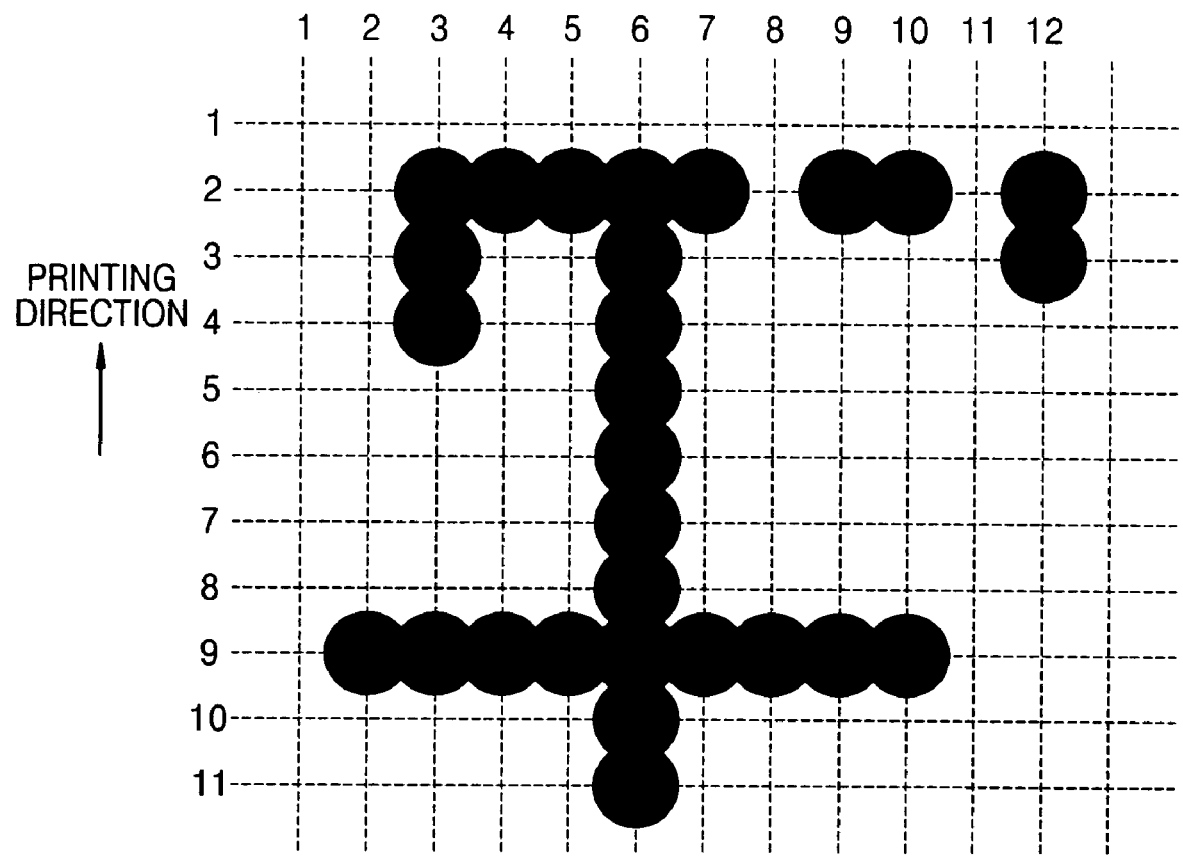
FIG. 1B is a diagram illustrating a dot arrangement corresponding to the waveform of the video pulses shown in FIG. 1A.

Reference will now be made in detail to an embodiment of the present invention, examples of which are illustrated in the accompanying drawings, wherein like reference numerals refer to the like elements throughout. The embodiment is described below to explain the present invention by referring to the figures.

Figure 2:
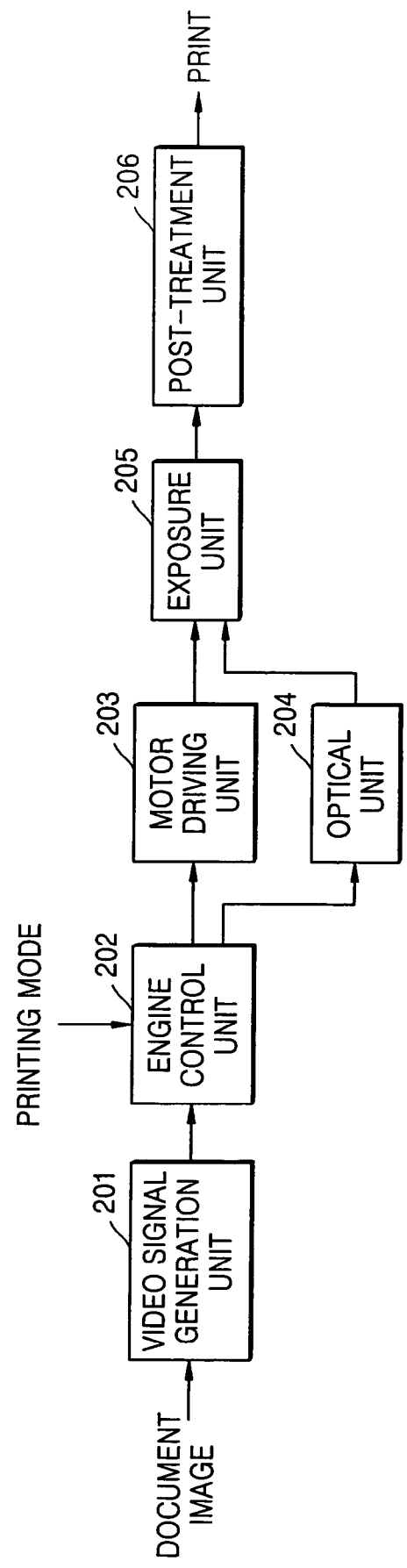
FIG. 2 is a block diagram of a fast printing apparatus according to an embodiment of the present invention.

FIG. 2 is a block diagram of a fast printing apparatus according to an embodiment of the present invention. Referring to FIG. 2, the fast printing apparatus includes a video signal generation unit 201, an engine control unit 202, a motor driving unit 203, an optical unit 204, an exposure unit 205, and a post-treatment unit 206. The video signal generation unit 201 corresponds to a video controller, and the motor driving unit 203, the optical unit 204, the exposure unit 205, and the post-treatment unit 206 correspond to a printer engine.

The video signal generation unit 201 receives a document image and outputs a video pulse signal corresponding to the received document image. The engine control unit 202 converts the video pulse signal into an appropriate signal for a printing mode selected by a user. For example, in a case where the user selects a fast printing mode, the engine control unit 202 converts the video pulse signal into a video pulse signal appropriate for the fast printing mode and outputs a motor driving signal and a laser beam generation signal corresponding to the converted video pulse signal. This process of converting the video pulse signal output from the video signal generation unit 201 into the video pulse signal appropriate for the fast printing mode is described in the following paragraphs with reference to FIG. 3.

Figure 3:
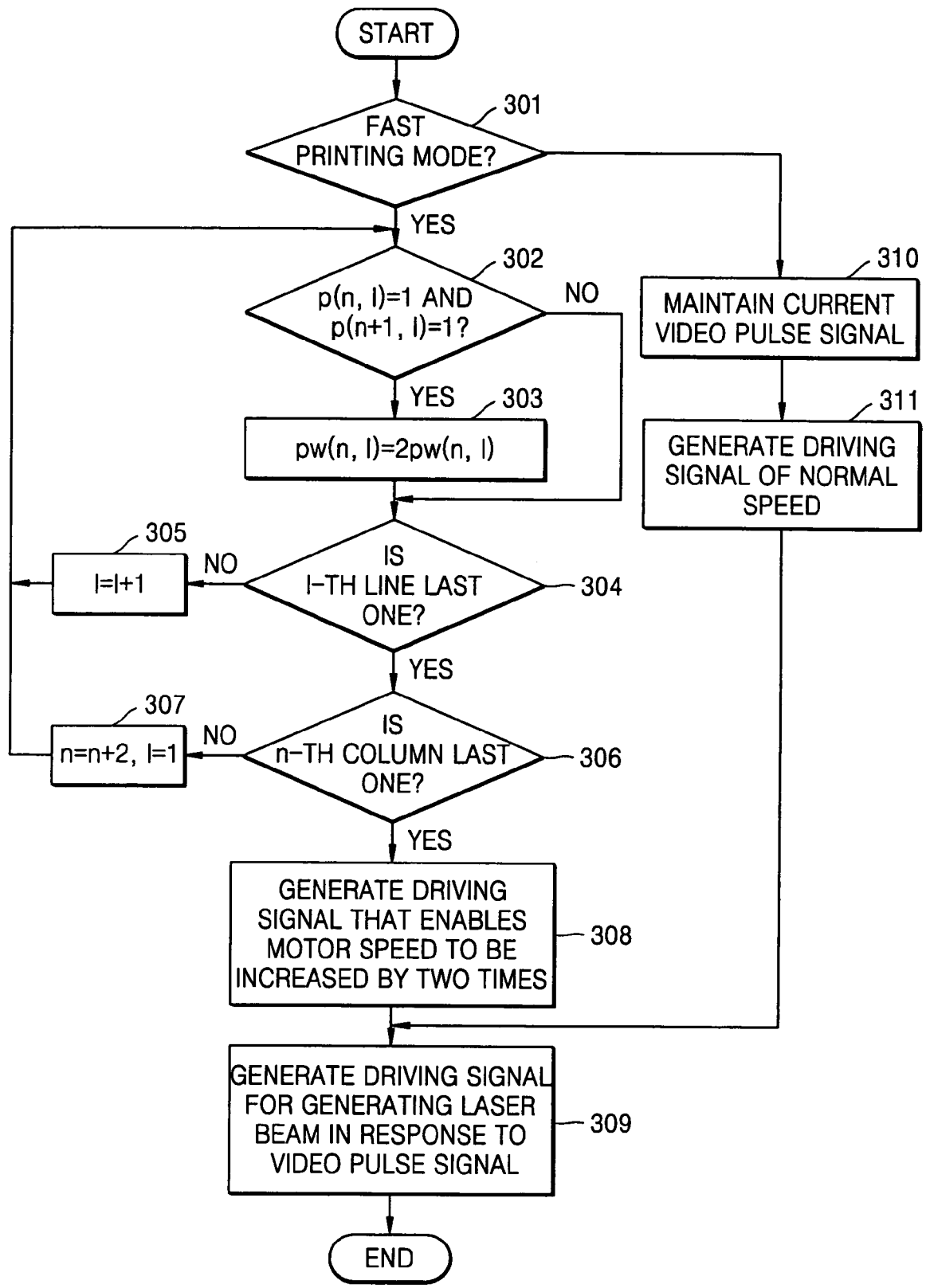
FIG. 3 is a flowchart of a method of converting a video pulse signal into a video pulse signal for a fast printing mode according to an embodiment of the present invention.

Referring to FIG. 3, a user selects a fast printing mode in operation 301. In operation 302, if a value of a video pulse signal p(n, l) in an l-th column of an n-th printing line is 1, it is checked whether or not a value of a video pulse signal p(n+1, 1) is 1. In operation 303, if both the video pulse signals p(n, l) and p(n+1, 1) have a value of 1, pulse width pw(n, l) of the video pulse signal p(n, l) is increased by two times. In operation 304, if the video pulse signal p(n, l) has a value of 1 but the video pulse signal p(n+1, 1) does not have a value of 1, the pulse width pw(n, l) of the video pulse signal p(n, l) is maintained as it is. In operation 304, it is checked whether or not operations 302 and 303 have already been carried out on every column of the n-th printing line. If operations 302 and 303 have already been carried out on every column of the n-th printing line, it is checked whether or not operations 302 through 304 have already been carried out on every printing line in operation 306. If the l-th column is not the last one, operations 302 and 303 are carried out on a next column in operation 305. If the n-th printing line is not the last one in operation 306, operations 302 through 304 are repeatedly carried out on an (n+2)-th line in operation 307. In other words, in the fast printing mode, a video pulse signal is output for every other printing line, and a video pulse width is increased by two times if video pulse signals have been output for two vertically adjacent printing lines of the same column.

Figure 4A:
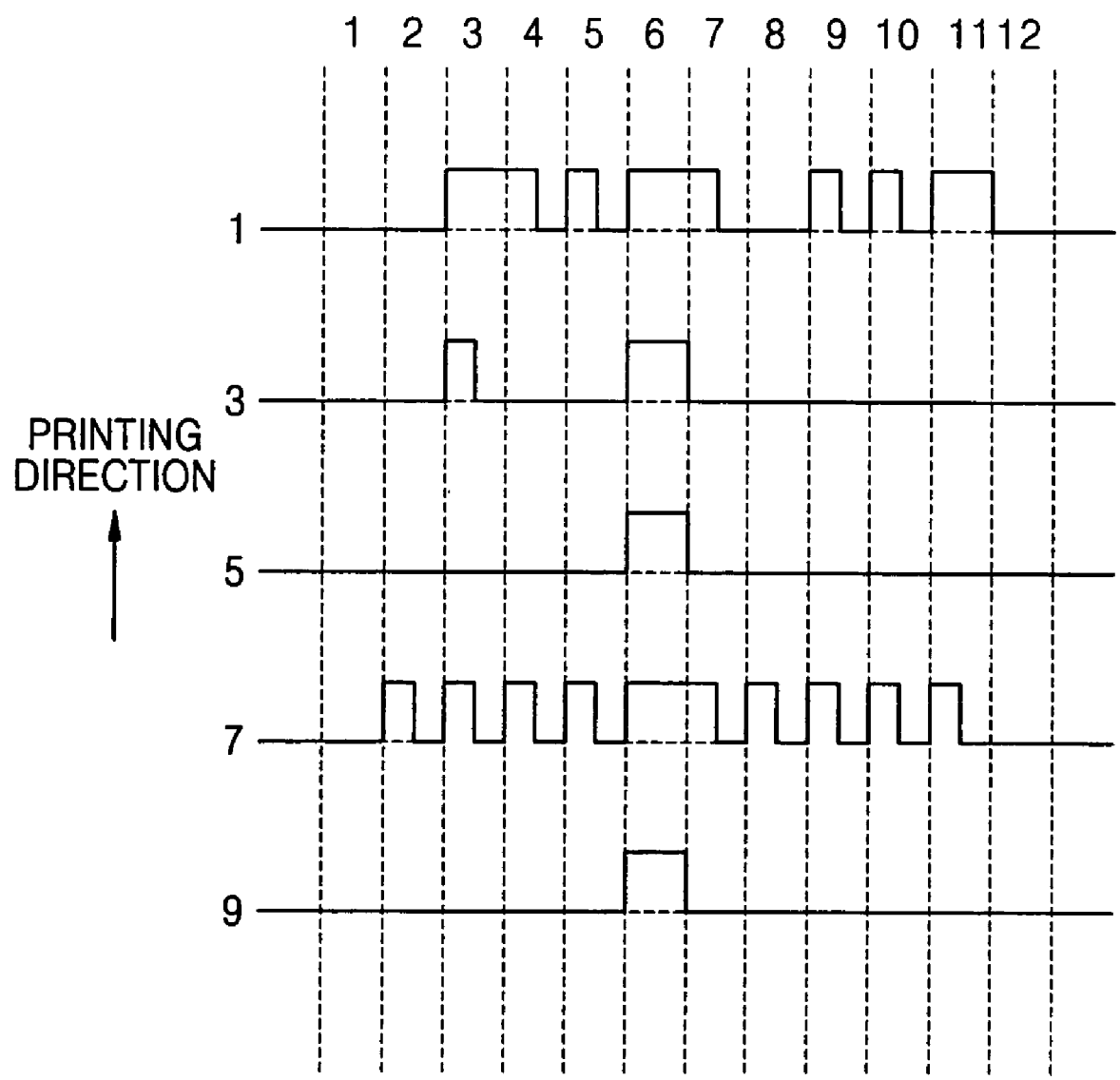
FIG. 4A is a waveform diagram of video pulse signals manipulated by and output from an engine control unit 202 of FIG. 2 in a fast printing mode.
Figure 4B:
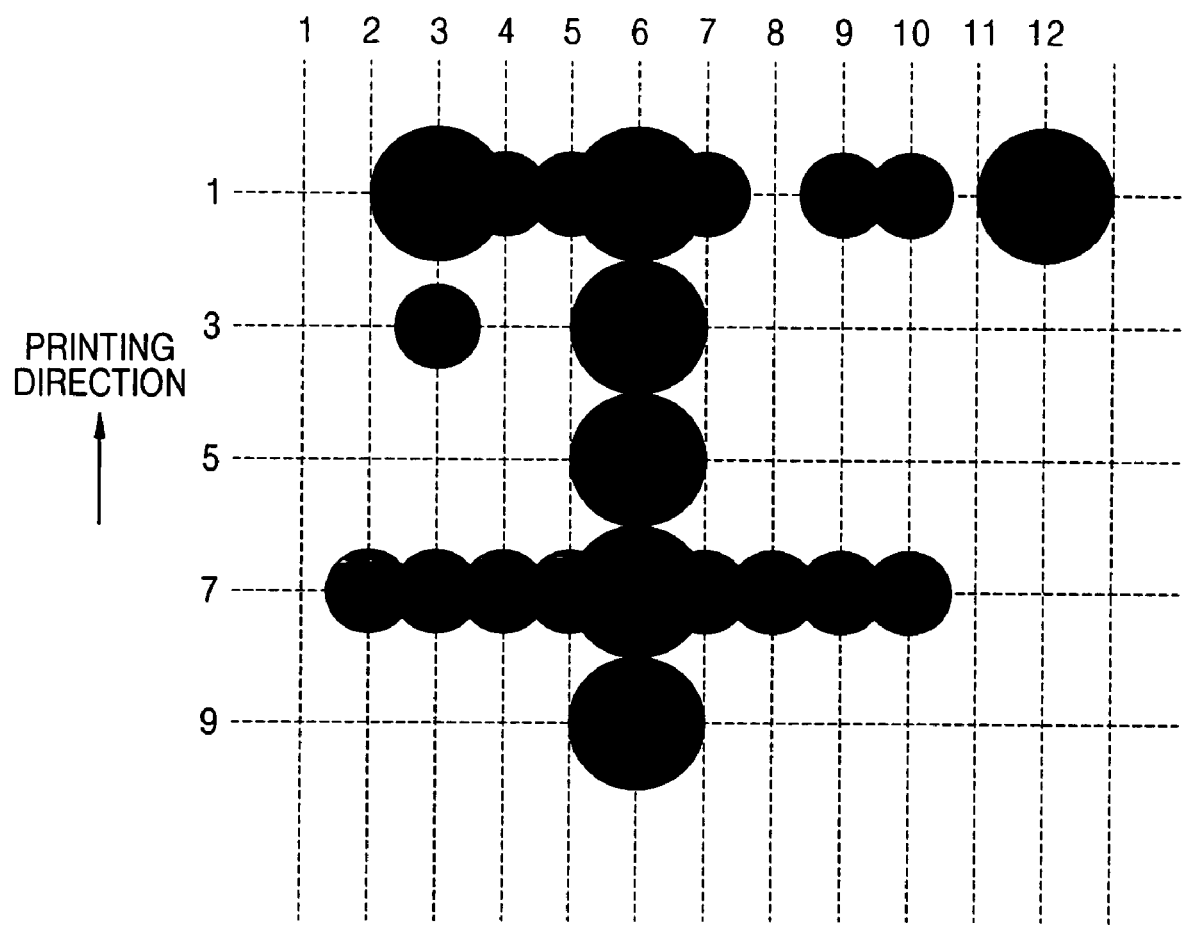
FIG. 4B is a diagram illustrating a dot arrangement corresponding to the waveform of the video pulse signals shown in FIG. 4A.

FIG. 4A is a waveform diagram of video pulse signals manipulated by and output from an engine control unit 202 in the fast printing mode, and FIG. 4B is a diagram illustrating a dot arrangement corresponding to the waveform of the video pulse signals shown in FIG. 4A. As compared with the waveform of the video pulse signals shown in FIG. 1A, the number of printing lines in FIG. 4A is reduced to half, and the pulse width of a specified printing line is increased by two times if video pulse signals have been output for printing lines adjacent to the specified line in the same column. FIG. 4B shows that the size of dots varies according to pulse width shown in FIG. 4A.

Referring to FIGS. 2-4B, once a video pulse signal for every printing line is converted into a video pulse signal appropriate for the fast printing mode, the engine control unit 202 generates a driving signal having a frequency that doubles a motor driving speed in response to the conversion of the video pulse carried out by the engine control unit 202, and outputs the driving signal to the motor driving unit 205 in operation 308. In operation 309, the engine control unit 202 outputs a laser beam generation signal corresponding to the converted video pulse signal to the optical unit 204.

If the user selects a normal speed printing mode in operation 301, the engine control unit 202 maintains a current video pulse signal in operation 310. The engine control unit 202 outputs a normal speed motor driving signal to the motor driving unit 203 in operation 311. Thereafter, the engine control unit 202 outputs a laser beam generation signal corresponding to the current video pulse signal to the optical unit 204 in operation 309.

The motor driving unit 203 drives a motor (not shown) to rotate a drum (not shown) in the exposure unit 205 by using the motor driving signal received from the engine control unit 202. The motor may be a stepping motor, and the width of each operation of the motor is increased by two times by the motor driving signal, as compared with a case where no video pulse signal has been converted. The optical unit 204 generates a laser beam corresponding to the laser beam generation signal output from the engine control unit 202, modulates the laser beam, and irradiates the laser beam on to the drum. Accordingly, a latent image is formed on the drum by the laser beam. The post-treatment unit 206 forms an image on the surface of the drum by fusing toner onto the latent image formed on the drum, as shown in FIG. 4B, and prints the image through a corona discharge.

According to the present invention, in the case of printing text documents, which do not have to be printed out with high quality or high resolution, it is possible to more quickly print out the text documents via a fast printing mode selected by a user.

Although an embodiment of the present invention have been shown and described, it would be appreciated by those skilled in the art that changes may be made to this embodiment without departing from the principles and spirit of the invention, the scope of which is defined in the claims and their equivalents.

What is claimed is:

1. A printing method for a laser beam printer, comprising:
    generating a first video signal for printing a document image;

converting the first video signal into a second video signal by adjusting the pulse width of the first video signal when a fast printing mode is selected;

generating a driving signal for the fast printing mode and rotating a drum in response to the driving signal; and generating a laser beam in response to the second video signal and irradiating the laser beam onto the drum.

2. The printing method of claim 1, further comprising printing the document image on a sheet of paper by fusing toner onto at least a portion of the drum where the laser beam is irradiated.

3. The printing method of claim 1, wherein the converting includes extracting every other printing line of the first video signal.

4. The printing method of claim 3, wherein, when video pulses exist both in an l-th column of an n-th printing line and in the l-th column of an (n+1)-th printing line, a pulse width of the l-th column of the n-th printing line is increased by as much as a specified value.

5. The printing method of claim 3, wherein the driving signal for the fast printing mode has a greater frequency than a driving signal for any other mode.

6. The printing method of claim 5, wherein the frequency for the fast printing mode is about two times greater than frequencies of the other print modes.

7. A printing apparatus comprising:
a video signal generation unit which outputs a first video signal for fast printing of a document image;
an engine control unit which converts the first video signal into a second video signal by adjusting the pulse width of the first video signal when a fast printing mode is selected, generates a driving signal for the fast printing mode, and generates a laser beam generating signal in response to the second video signal;
a motor driving unit which rotates a drum in response to the driving signal; and
an optical unit which generates a laser beam in response to the laser beam generation signal and irradiates the laser beam onto the drum.

8. The printing apparatus of claim 7, further comprising a post-treatment unit which prints the document image on a sheet of paper by fusing toner onto at least a portion of the drum where the laser beam is irradiated.

9. The printing apparatus of claim 8, wherein, when a printing mode other than the fast printing mode is selected, the engine control unit does not convert the first video signal and outputs a driving signal and a laser beam generation signal corresponding to the first video signal.

10. The printing apparatus of claim 7, wherein the engine control unit converts the first video signal by extracting every other printing line of the first video signal.

11. The printing apparatus of claim 10, wherein the engine control unit increases a pulse width of an l-th column of an n-th printing line by as much as a specified value when video pulse signals have been output for both the l-th column of the n-th printing line and an l-th column of an (n+1)-th printing line.

12. The printing apparatus of claim 10, wherein a frequency of the driving signal for the fast printing mode is greater than a frequency of a driving signal for any other mode.

13. The printing apparatus of claim 12, wherein the frequency for the fast printing mode is about two times as great as in any other printing mode.

14. The printing apparatus of claim 7, wherein the video signals are pulse signals.

15. The printing apparatus of claim 7, further comprising a user interlace by which a user selects a printing mode.

16. The printing apparatus of claim 7, further comprising a motor which rotates the drum in response to the driving signal.

17. The printing apparatus of claim 16, wherein the motor is a stepping motor.

18. The printing apparatus of claim 17, wherein a pulse width of the driving signal for each operation is, when the driving signal is for the fast printing mode, up to about two times greater than the driving signal is for any other printing mode.

19. A printing method comprising:
converting a first video signal for an image into a second video signal by adjusting the pulse width of the first video signal when the image is to be printed in a first print mode by extracting every other printing line of the first video signal;
rotating a drum in response to a driving signal for the first print mode; and
irradiating a laser beam onto the drum according to the second video signal.

20. The printing method of claim 19, wherein the rotating includes rotating the drum in response to a driving signal for a second print mode and the irradiating includes irradiating a laser beam onto the drum according to the first video signal, when the image is to be printed in the second print mode.

* * * * *

UNITED STATES PATENT AND TRADEMARK OFFICE
CERTIFICATE OF CORRECTION

PATENT NO. : 7,289,241 B2
APPLICATION NO. : 10/900428
DATED : October 30, 2007
INVENTOR(S) : Dong-myong Shin It is certified that error appears in the above-identified patent and that said Letters Patent is hereby corrected as shown below:

Column 6, Line 20, change "interlace" to --interface--.

Signed and Sealed this

Fifteenth Day of April, 2008

JON W. DUDAS
*Director of the United States Patent and Trademark Office*